United States Patent
Tan et al.

(10) Patent No.: US 9,551,844 B2
(45) Date of Patent: Jan. 24, 2017

(54) PASSIVE OPTICAL ALIGNMENT

(75) Inventors: Michael Renne Ty Tan, Menlo Park, CA (US); Sagi Varghese Mathai, Palo Alto, CA (US); Paul Kessler Rosenberg, Sunnyvale, CA (US); Georgios Panotopoulos, Berkeley, CA (US); David A. Fattal, Mountain View, CA (US); Wayne V. Sorin, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 415 days.

(21) Appl. No.: 13/995,492

(22) PCT Filed: Jan. 11, 2011

(86) PCT No.: PCT/US2011/020785
§ 371 (c)(1),
(2), (4) Date: Jun. 18, 2013

(87) PCT Pub. No.: WO2012/096651
PCT Pub. Date: Jul. 19, 2012

(65) Prior Publication Data
US 2013/0266255 A1    Oct. 10, 2013

(51) Int. Cl.
*G02B 6/42* (2006.01)
(52) U.S. Cl.
CPC .............. *G02B 6/42* (2013.01); *G02B 6/4259* (2013.01); *G02B 6/423* (2013.01); *G02B 6/428* (2013.01); *G02B 6/4232* (2013.01); *G02B 6/4249* (2013.01); *G02B 6/4292* (2013.01); *Y10T 29/49002* (2015.01)

(58) Field of Classification Search
None
See application file for complete search history.

(56) References Cited

U.S. PATENT DOCUMENTS

| | | | |
|---|---|---|---|
| 5,247,597 A | 9/1993 | Blacha et al. | |
| 5,940,564 A | 8/1999 | Jewell | |
| 6,243,508 B1 | 6/2001 | Jewell et al. | |
| 6,512,861 B2 * | 1/2003 | Chakravorty et al. | 385/14 |

(Continued)

FOREIGN PATENT DOCUMENTS

| | | |
|---|---|---|
| CN | 1541342 A | 10/2004 |
| CN | 1599159 A | 3/2005 |

(Continued)

OTHER PUBLICATIONS

Doany, Fuad E., et al.; "Dense 24 TX + 24 RX Fiber-Coupled Optical Module Based on a Holey CMOS Transceiver IC"; Electronic Components and Technology Conference; IEEE; 2010; pp. 247-255.

(Continued)

*Primary Examiner* — Tina Wong
(74) *Attorney, Agent, or Firm* — Fabian VanCott (57) ABSTRACT

A system for passive optical alignment includes an through optical via formed through a substrate, an optical transmission medium secured to a first side of the substrate such that the optical transmission medium is aligned with the through optical via, and an optoelectronic component secured to a second side of the substrate such that the active region of said optoelectronic component is aligned with the through optical via.

19 Claims, 8 Drawing Sheets

(56) References Cited

U.S. PATENT DOCUMENTS

| | | | |
|---|---|---|---|
| 6,527,456 B1 | 3/2003 | Trezza | |
| 6,605,828 B1 | 8/2003 | Schwarzrock et al. | |
| 6,626,585 B1 | 9/2003 | Malone | |
| 6,800,946 B2 | 10/2004 | Chason et al. | |
| 6,907,151 B2 | 6/2005 | Yunus | |
| 6,931,181 B2 | 8/2005 | Jewell et al. | |
| 6,933,173 B2 | 8/2005 | Yunus | |
| 6,940,182 B2 | 9/2005 | Hilton et al. | |
| 7,251,398 B2 | 7/2007 | Baets et al. | |
| 7,263,248 B2 * | 8/2007 | Windover | H05K 1/0274 385/14 |
| 7,389,026 B2 | 6/2008 | Nagasaka | |
| 7,466,880 B2 * | 12/2008 | Windover | H05K 1/0274 385/129 |
| 7,720,337 B2 | 5/2010 | Lu et al. | |
| 7,821,131 B2 | 10/2010 | Johnson | |
| 7,853,105 B2 | 12/2010 | Budd et al. | |
| 7,961,770 B1 | 6/2011 | Zhu et al. | |
| 8,265,432 B2 * | 9/2012 | Doany et al. | 385/14 |
| 8,536,512 B2 * | 9/2013 | Shiraishi | H05K 1/0274 250/214.1 |
| 8,708,576 B2 * | 4/2014 | Shacklette | G02B 6/4212 385/14 |
| 2001/0036344 A1 | 11/2001 | Steinberg et al. | |
| 2002/0047216 A1 * | 4/2002 | Jiang et al. | 257/778 |
| 2002/0159673 A1 | 10/2002 | McFarland et al. | |
| 2004/0057648 A1 | 3/2004 | Yunus | |
| 2004/0076382 A1 | 4/2004 | Saia et al. | |
| 2004/0118599 A1 | 6/2004 | Chason | |
| 2004/0126050 A1 | 7/2004 | Claydon et al. | |
| 2004/0156576 A1 | 8/2004 | Windover | |
| 2005/0018962 A1 | 1/2005 | Cho et al. | |
| 2006/0239631 A1 | 10/2006 | Frenzel | |
| 2008/0291552 A1 | 11/2008 | Nogami | |
| 2009/0162005 A1 | 6/2009 | Lu et al. | |
| 2010/0061418 A1 | 3/2010 | Lambkin et al. | |
| 2010/0322551 A1 * | 12/2010 | Budd | G02B 6/4206 385/14 |
| 2011/0012249 A1 | 1/2011 | Daubenspeck et al. | |
| 2011/0044367 A1 * | 2/2011 | Budd | G02B 6/4201 372/50.21 |
| 2011/0095421 A1 | 4/2011 | Kim et al. | |
| 2011/0260338 A1 | 10/2011 | Lee | |
| 2013/0266255 A1 | 10/2013 | Tan et al. | |

FOREIGN PATENT DOCUMENTS

| | | |
|---|---|---|
| CN | 1723405 A | 1/2006 |
| CN | 1732399 A | 2/2006 |
| JP | 2010042633 A | 2/2010 |
| JP | 2011082305 | 4/2011 |
| KR | 10-0691443 | 2/2007 |
| WO | WO-2004049521 | 6/2004 |
| WO | WO-2011060559 A1 | 5/2011 |
| WO | WO-2012096651 | 7/2012 |
| WO | WO-2013036221 | 3/2013 |

OTHER PUBLICATIONS

International Search Report, Oct. 23, 2012, PCT Application No. PCT/US2012/023251.

International Search Report, Sep. 30, 2011, PCT Application No. PCT/US2011/020785.

International Search Report, Apr. 9, 2012, PCT Application No. PCT/US2011/050551.

Li, B., et al.; "Low-Cost High-Efficiency Optical Coupling Using Through-Silicon-Hole in Parallel Optical Transceiver Module"; Applied Physics A; Feb. 19, 2009; pp. 1123-1126; vol. 95; http://www.springerlink.com/content/97328k55664702k5/fulltext.pdf.

Yan, Jia, et al.; "Passive Fibre Alignment on Optoelectronic Components for Electro-Optical Links Based on Single-Chip Technology and VCSELs"; Jan. 2010; http://en.cnki.com.cn/Article_en/CJFDTOTAL-YZDL201001014.htm.

Extended European Search Report received in EP Application No. 12867223.5, Aug. 21, 2015, 9 pages.

Holm, Johan, et al.; "Through-Etched Silicon Carriers for Passive Alignment of Optical Fibers to Surface-Active Optoelectronic Components"; May 8, 2000.

Supplemental European Search Report, Jan. 26, 2015, European Patent Application No. 11872062.2, 3 pages.

* cited by examiner

PASSIVE OPTICAL ALIGNMENT

BACKGROUND

Optical engines are commonly used to transfer electronic data at high rates of speed. An optical engine includes hardware for transferring an electrical signal to an optical signal, transmitting that optical signal, receiving the optical signal, and transforming that optical signal back into an electrical signal. The electrical signal is transformed into an optical signal when the electrical signal is used to modulate an optical source device such as a laser. The light from the source is then coupled into an optical transmission medium such as an optical fiber. After traversing an optical network through various optical transmission media and reaching its destination, the light is coupled into a receiving device such as a detector. The detector then produces an electrical signal based on the received optical signal for use by digital processing circuitry.

The mechanism for coupling an optical transmission medium to either a source device or a receiving device is typically done through a process called active alignment. Active alignment typically involves a lens system to direct light from a source device into an optical transmission medium or to direct light from the optical transmission medium to a receiving device. Active alignment utilizes a feedback signal to adjust the physical location of key components that can be time consuming. The lens system must be carefully aligned to maximize the coupling of optical power from the source to the optical medium and back to the detector during manufacture. This process is both time consuming and costly. Additionally, the lenses used in the lens system can be costly.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

As mentioned above, the mechanism for coupling an optical transmission medium to a source device or a receiving device is typically done through a process called active alignment. Active alignment typically utilizes lens systems to direct light from a source device into an optical transmission medium or to direct light from the optical transmission medium to a receiving device. The process of active alignment can be complicated and time consuming as the lens system must be carefully aligned during manufacture. Additionally, the lenses used in the lens system can be costly.

In light of this and other issues, the present specification discloses a system that allows the passive alignment of optical engines. This passive alignment does not require the use of lenses when coupling an optical transmission medium to a source device or a receiving device. According to certain illustrative examples, a substrate includes a number of through optical vias. These through optical vias are configured to act as optical waveguides. An optical waveguide is a physical structure that allows light to be guided and propagate through. Both the optical transmission medium and the source device or receiving device can be secured to respective sides of the substrate through a variety of mechanisms.

In one example, the source device or receiving device can be secured to one side of the substrate by solder bumping techniques. More detail on these techniques will be described below. Additionally, the optical transmission medium can be secured to the opposing side of the substrate through use of mechanical alignment features such as spheres connected to the substrate and circular holes connected to the terminal housing of the optical transmission medium. More detail on this method will also be discussed below. These examples of methods for securing components to the substrate also allow for the alignment of those components to the optical waveguide.

Through use of methods and systems described herein, optoelectronic components such as source devices and receiving devices can be effectively coupled to an optical transmission medium without the use of lens systems and active alignment techniques. Thus, the coupling can be achieved efficiently at a lower cost. Additionally, more optical connections can be fit into a smaller space, thus providing a more efficient use of chip space.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Throughout this specification and in the appended claims, the term "optoelectronic component" refers to either an optical source device such as a laser or an optical receiver device such as a detector. Additionally, the term "active region" refers to the actual part of the optoelectronic component that emits light or senses light. For example, in the case that the optoelectronic component is a source device, then the active region is the actual component which is emitting light. In the case that the optoelectronic component is a receiver device, the active region is the actual component where light received is impinged upon. Furthermore, the term "light" refers to any type of electromagnetic radiation.

Throughout this specification and in the appended claims, the term "through optical via" refers to a hole formed through a substrate. The hole is configured to allow light to propagate through by bouncing off of the walls of the hole.

Throughout this specification and in the appended claims, the term "solder bump" is to be broadly interpreted as a small amount of solder which may be formed into any practical shape such as a ball or a pillar.

Figure 1:
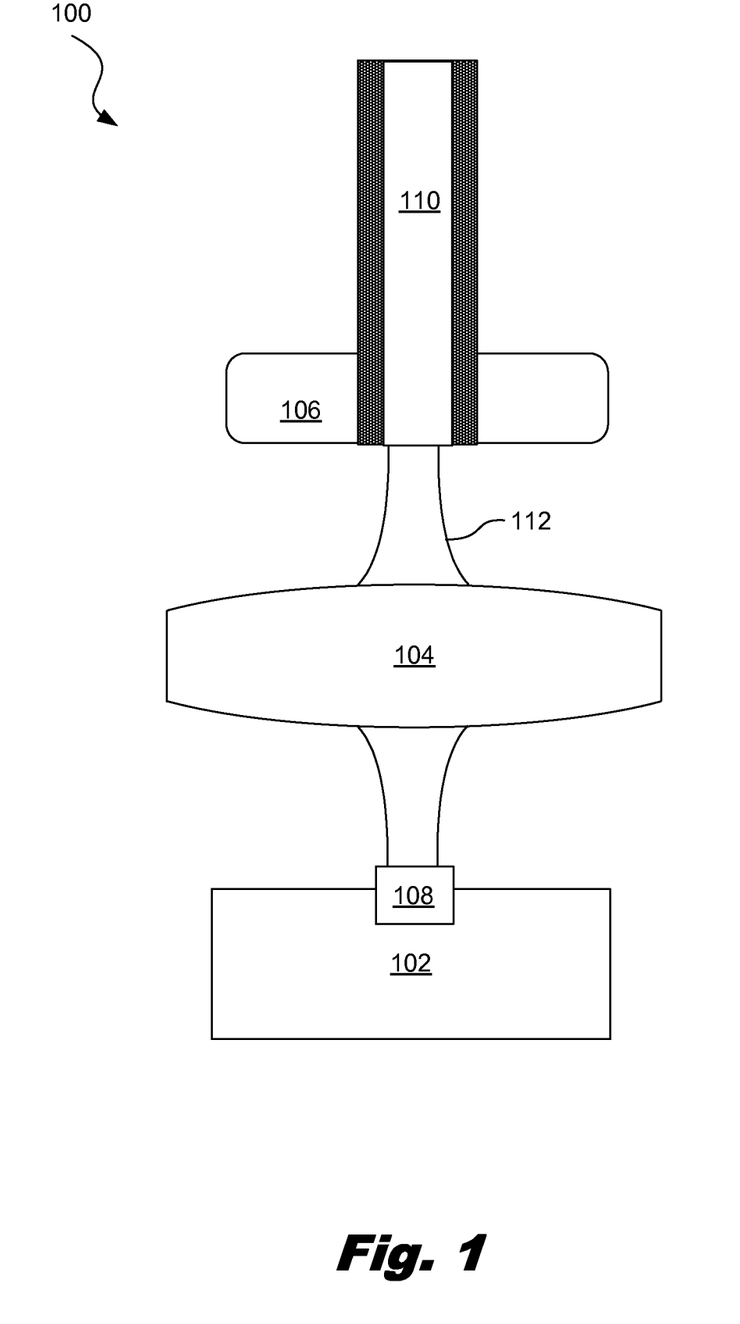
FIG. 1 is a diagram illustrating active alignment, according to one example of principles described herein.

Referring now to the figures, FIG. 1 is a diagram illustrating active alignment (100). According to certain illustrative examples, a system using active alignment (100) includes an optoelectronic component (102). The active region (108) of the optoelectronic component (102) is the part that actually emits light or detects light. A lens system (104) is used to couple light (112) between the optoelectronic component (102) and the terminal (106) of the optical transmission medium (110).

In the example where the optoelectronic component (102) is a source device such as a laser emitter, the active region (108) projects light into the lens system (104). The lens system (104) may include a number of lenses which are designed to direct the light (112) from the source device into the optical transmission medium (110). The lens system (104) directs the light (112) into the optical transmission medium (110) based on the curvature of the lenses within the system as well as the distances between lenses, the optoelectronic component (102) and the opening of the optical transmission medium (110). Use of the lens system (104) requires precise placement of the lens system between the optoelectronic component (102) and the optical transmission medium (110). This precision complicates the manufacturing process and thus adds to the cost.

Figure 2:
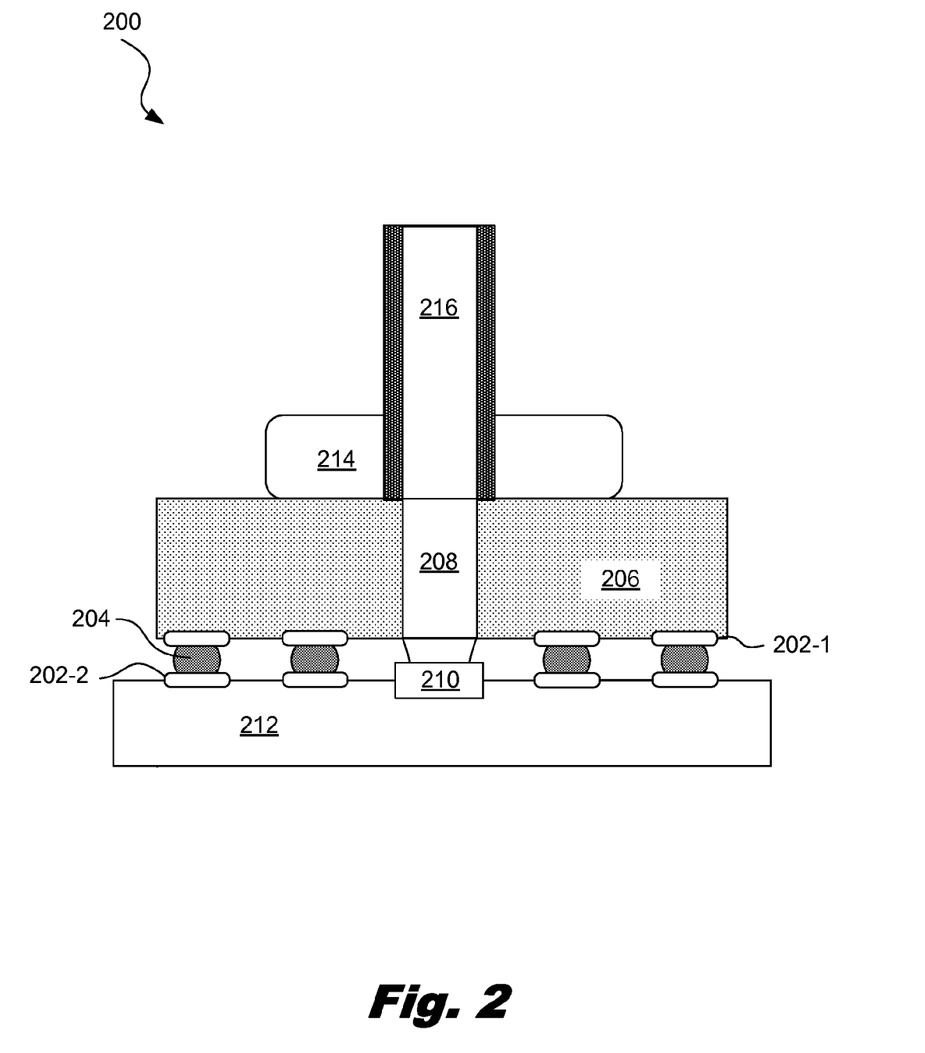
FIG. 2 is a diagram illustrating passive alignment, according to one example of principles described herein.

FIG. 2 is a diagram illustrating passive alignment (200). Passive alignment (200) does not require the use of a lens system (e.g. 104, FIG. 1). According to certain illustrative examples, a system that uses passive alignment (200) includes a substrate (206) with a number of through optical vias (208) acting as optical waveguides formed through the substrate. The substrate may be made of glass, plastic, metal or a semiconductor material such as silicon. A mechanical connector (214) is used to couple the optical transmission medium (216) to the through optical via (208).

A waveguide is a physical structure that provides for the propagation of electromagnetic radiation through the structure. An optical waveguide is a structure that provides for the propagation of electromagnetic radiation at a relatively high frequency. At this frequency, light can be propagated through a first dielectric material surrounded by a second dielectric material if the second material has a lower index of refraction than the first material.

An optical fiber, which is a type of optical transmission medium (216), includes a core circular structure with a relatively high index of refraction surrounded by a shell structure with a relatively low index of refraction. Essentially, through such a structure, light bounces off the inner walls as it traverses the length of the fiber.

The through optical vias (208) formed through the substrate (206) may also be circular. A coating of the inner walls can have a lower index of refraction than the material in the center of the waveguide (208). More details on different waveguide structures will be described below in the text accompanying FIGS. 7A and 7B.

The optoelectronic component (212) is secured to the substrate such that the active region (210) of the optoelectronic component (210) is properly aligned with the through optical via (208). One way of securing the optoelectronic component (212) to the substrate (206) is through solder bumping. Solder bumping involves the placement of a first set of bond pads (202-1) onto the substrate (206). A second set of bond pads (202) are then placed onto the optoelectronic component (212). The second set of bond pads (202-2) are placed spatially identically to the placement of the first set of bond pads (202-1). Small solder bumps (204) are then placed between the two sets of bond pads (202-1, 202-2).

The passive alignment system may be formed, for example, through a photolithographic process. Photolithography is a process whereby portions of a substrate are removed from regions either covered or not covered by a mask. To form the through optical vias (208), a mask may be used to expose the locations where through optical vias are to be formed through an etching process. Another mask can then be used to form the locations of the bond pads. These masks can be properly aligned so that the through optical vias (208) are appropriately spaced in relation to the bond pads (202). This appropriate spacing, which corresponds to the bond pad spacing on the optoelectronic component (212), allows for proper alignment of the active region (210) to the through optical vias (208). This photolithographic process may be performed on a wafer level. For example, if the substrate (206) is a semiconductor material, then the photolithographic process can be applied to the entire semiconductor wafer.

Figure 3A:
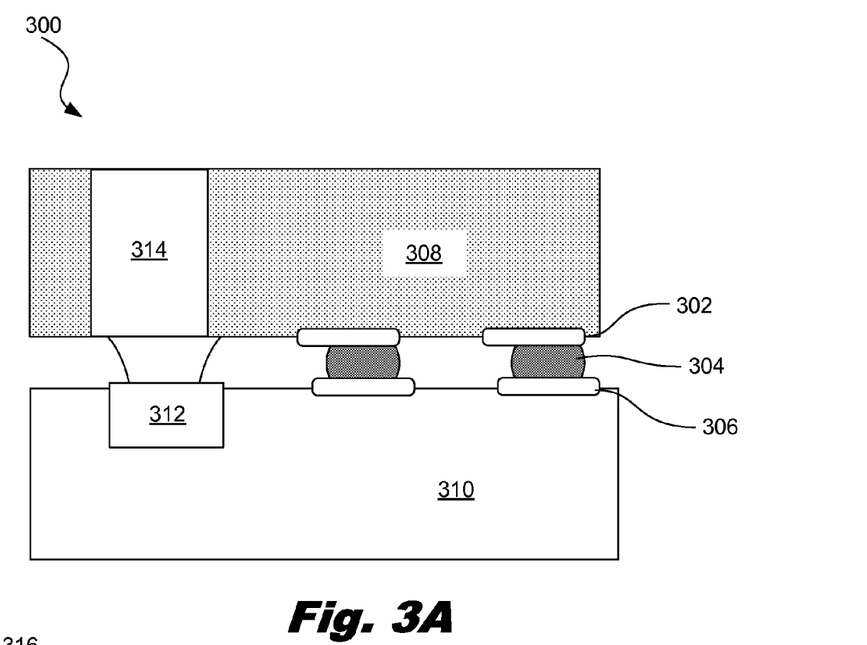
FIGS. 3A and 3B are diagrams showing an optoelectronic component before and after it is aligned with a through optical via of a semiconductor substrate, according to one example of principles described herein.
Figure 3B:
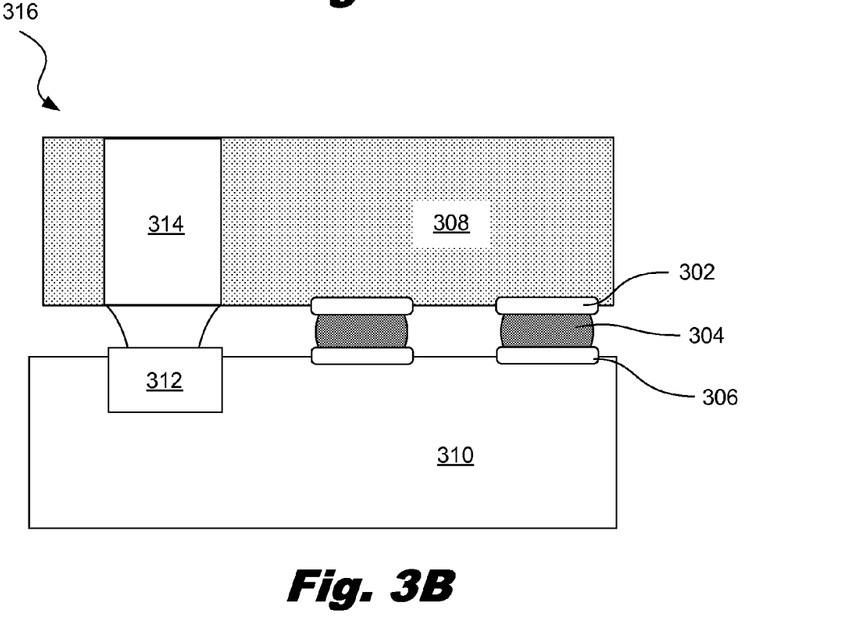

FIGS. 3A and 3B are diagrams showing an optoelectronic component (310) before and after having the active region (312) aligned with a through optical via of a semiconductor substrate (308). FIG. 3A is a diagram showing the through optical via (314) before it is aligned with the active region (312). According to certain illustrative examples, the solder bumps (304) are placed onto either the first set of bond pads (302) or the second set of bond pads (306). At this point the solder bumps are not yet completely melted. Rather they are in a state so as to stick to the bond pads (302). When the substrate (308) is placed near the optoelectronic component (310) so that the solder bumps (304) come into contact with both sets of bond pads (302, 306), the active region (312) will not quite be aligned with the through optical via (314).

With the application of the appropriate amount of heat, the solder bumps (304) will completely melt. The size, shape, and material of the bond pads (306) and the size, shape, and material of the solder bumps (304) is such that the surface tension will bring the first set of bond pads (302) into alignment with the second set of bond pads (306). In one example, the solder bumps can be approximately 30 micrometers (μm) in diameter.

FIG. 3B is a diagram showing the through optical via (314) after it is aligned with the active region (312) of the optoelectronic component (310). After the heat is no longer being applied, the melted solder material will cool and solidify. This will hold the optoelectronic component (310) in place so that the active region (312) is properly aligned with the waveguide. Thus, when the active region emits or detects light, that light will be appropriately directed into or received from the through optical via (314).

Figure 4A:
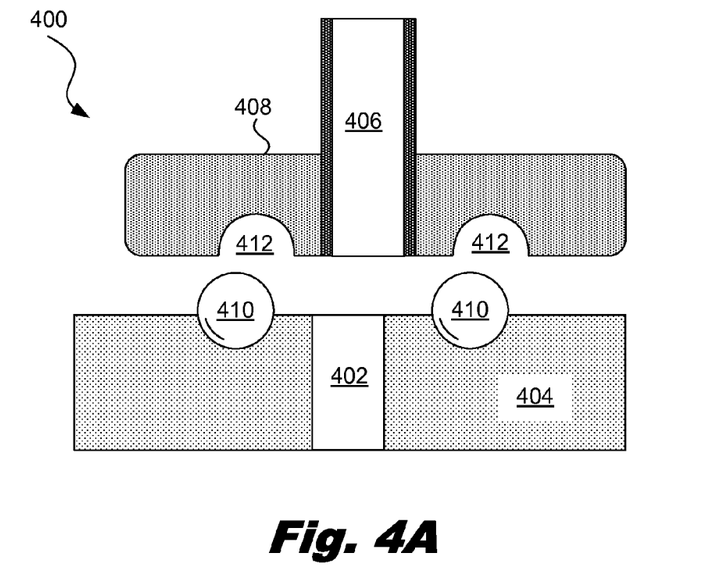
FIGS. 4A and 4B are diagrams showing an optical transmission medium before and after being aligned with a through optical via of a semiconductor substrate, according to one example of principles described herein.
Figure 4B:
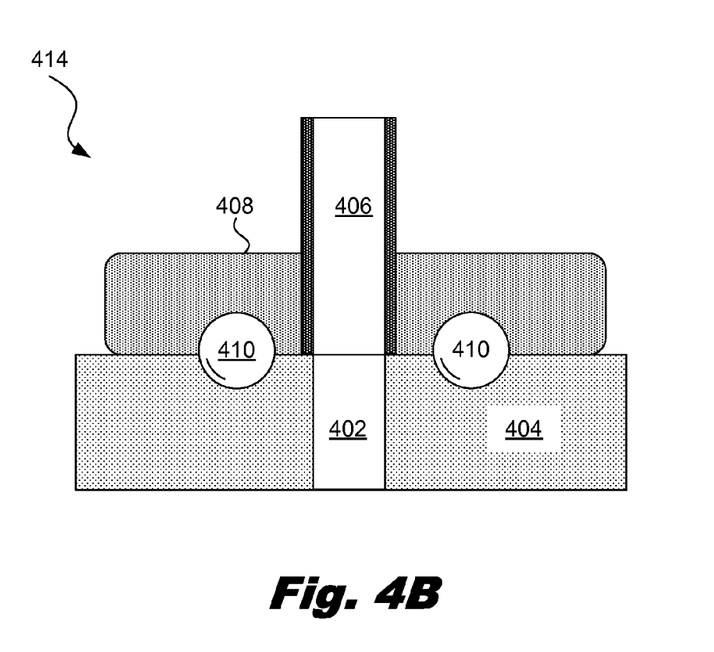

FIGS. 4A and 4B are diagrams showing an optical transmission medium (406) before and after being aligned with a through optical via (402) of a semiconductor substrate (404). According to certain illustrative examples, a set of spheres (410) secured to the substrate (404) are designed to fit into a set of circular or spherical holes (412) formed into the mechanical connector (408) of the optical transmission medium (406).

FIG. 4A is a diagram (400) showing the mechanical connector (408) of an optical transmission medium (406) before it is aligned with the through optical via (402) in the substrate (404). The diameter of the holes (412) is such that when placed onto the spheres (410), there is a specific spot in which the opening of the optical transmission medium will be placed. This specific spot will provide an efficient coupling between the optical transmission medium (406) and the through optical via (402). If the circular holes (412) are not placed onto the spheres (410), then the optical transmission medium (406) will not be completely aligned with the through optical via (402).

FIG. 4B is a diagram (414) showing the mechanical connector (408) of an optical transmission medium (406) after it is aligned with the through optical via (402) in the substrate (404). With the optical transmission medium (406) properly aligned and coupled to the through optical via (402), an optical signal will effectively be transferred between the two components.

In one example, the spheres (410) may be secured to the mechanical connector (408) and the holes (412) are formed into the substrate (404). Furthermore, other mechanisms for securing the mechanical connector to the substrate may be used. For example, a pin and hole mechanism may be used. Specifically, a number of pins may be secured to the mechanical connector (408). These pins may be designed to fit into holes formed into the substrate (404). Additionally or alternatively, pins may be secured to the substrate (404) and holes for those pins may be formed into the mechanical connector. The positioning of the holes and the pins can be such that the optical transmission medium (406) is properly aligned with the through optical via (402).

Figure 5A:
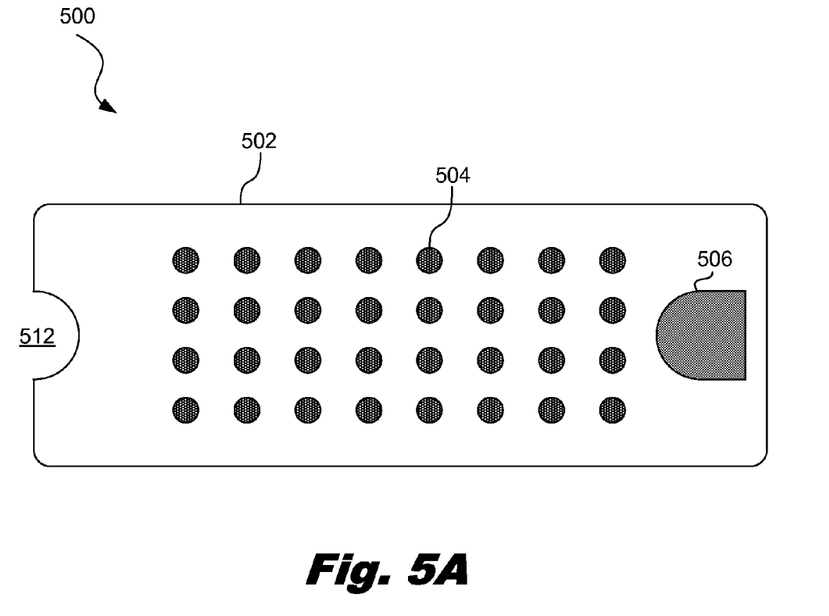
FIG. 5A is a diagram showing an illustrative top view of multiple through optical vias formed through a substrate, according to one example of principles described herein.

FIG. 5A is a diagram showing an illustrative top view (500) of multiple through optical vias (504) formed through a substrate (502). According to certain illustrative examples, a substrate (502) includes a two dimensional array of waveguides. This first side of the substrate (502) includes a pin (506) and a hole (512) for the purpose of securing a mechanical connector (e.g. 408) to the substrate (502). However, other mechanisms for securing the mechanical connector to the substrate (502) may be used.

In the case where the optical transmission medium being used is an optical fiber, the mechanical connector to be secured to such a substrate (504) will also include a similar two dimensional formation of fiber optic terminations. This allows a bundle of optical fibers to be coupled to the source devices and receiving devices secured to the other side of the substrate (502).

Figure 5B:
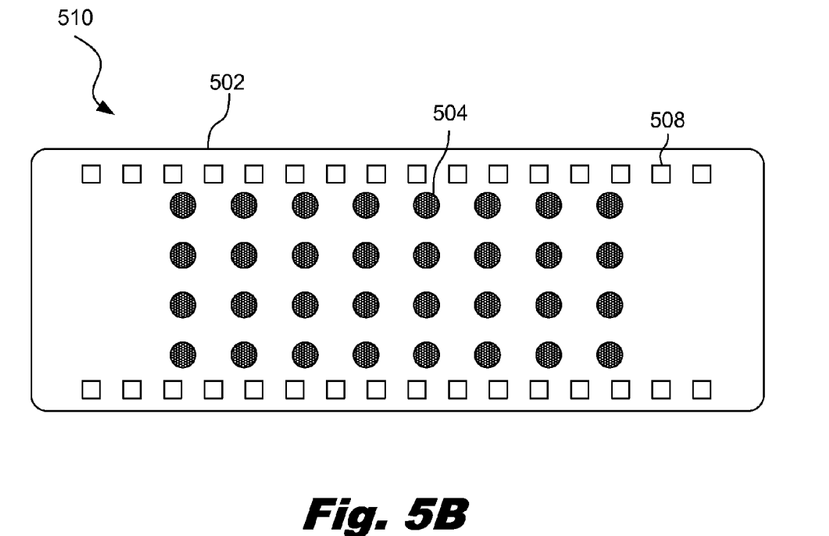
FIG. 5B is a diagram showing an illustrative bottom view of multiple through optical vias formed through a substrate, according to one example of principles described herein.

FIG. 5B is a diagram showing an illustrative bottom view (510) of multiple through optical vias formed through a substrate (502). According to certain illustrative examples, the opposing side of the substrate includes a set of bond pads (508). These bond pads are used to secure a two dimensional array of optoelectronic components such as source devices and receiving devices to the substrate (502). The spacing of the bond pads (508) matches the spacing of bond pads on an optoelectronic component. The spacing of the bond pads on the optoelectronic components is such that when the two sets of bond pads are aligned, the multiple active regions of the optoelectronic component will be aligned with the through optical vias. Thus, light will efficiently pass between the through optical vias (504) and the optoelectronic components.

For example, if the optoelectronic component is a laser device, then the light projected by that laser device will be efficiently directed into the associated through optical via. After passing through the waveguide, the light being emitted from that laser device will be coupled into the optical transmission medium for transmission to a particular destination. Alternatively, if the optoelectronic component is a detector device designed to detect an optical signal, then the light coming from the optical transmission medium and through an through optical via will effectively reach the detector device. This will allow the optical signal to be effectively converted into an electrical signal.

Figure 6:
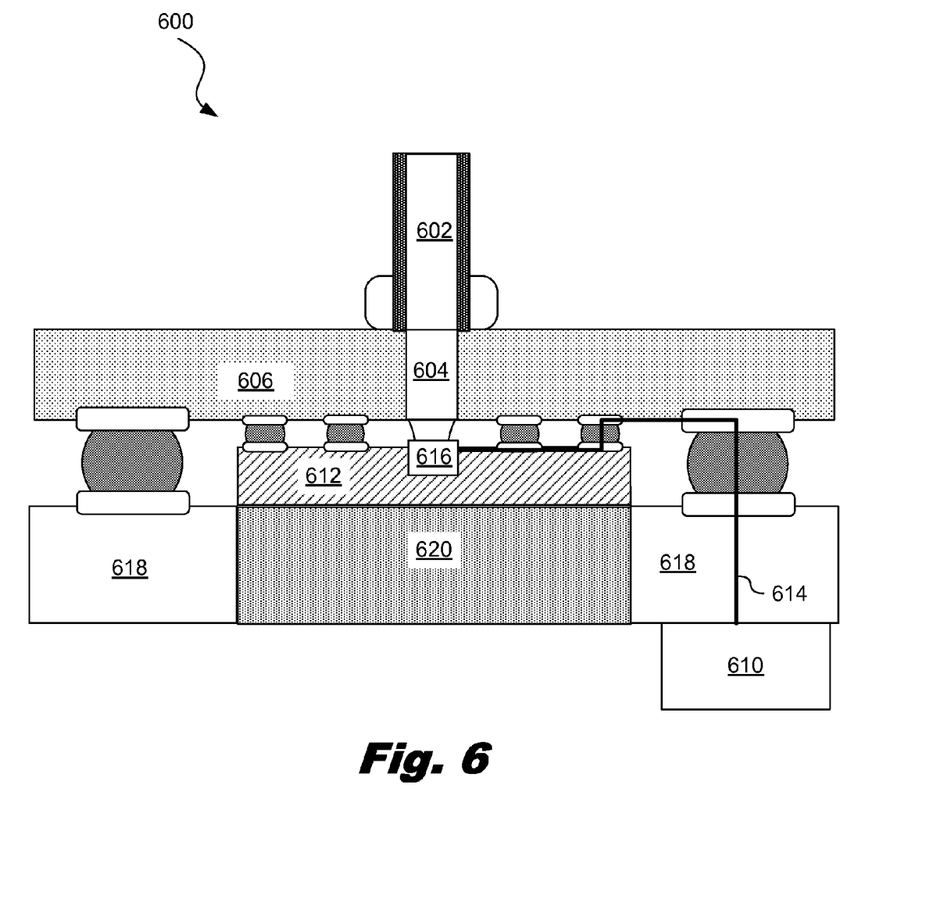
FIG. 6 is a diagram showing illustrative placement of circuitry used to process signals transmitted and received through the optical engine, according to one example of principles described herein.

FIG. 6 is a diagram showing illustrative placement of circuitry used to process signals transmitted and received through an optical engine. As mentioned above, optical engines are used to transfer electrical signals into optical signals before transmission over an optical medium. Upon arriving at the destination, the optical signal is transformed back into an electrical signal. The electrical signal is typically processed by a processing module before being transformed into an optical signal. The processing module (610) shown in FIG. 6 may be the module used at either the transmission or receiving end of the communication. Thus, a processing module (610) on the transmission end includes the hardware (i.e. a laser driver integrated circuit) that formats an electrical signal for transformation into an optical signal. Additionally, a processing module (610) on the receiving end (i.e. a receiver integrated circuit) formats the detected optical signal back into a format to be used by standard digital processing circuitry.

In one example, the printed circuit board (618) may fit around a heat sink material (620) used to support the optoelectronic component (612). In the case that the optoelectronic component (612) is a detector device, the electrical signal created from the detected optical signal can be sent through the bond pads, along the substrate (606), and through the solder bumps securing the printed circuit board to the substrate (606). The black line (614) illustrates the general route taken by the electrical signal, and not necessarily the physical structure that carries that signal. The physical structure may include conductive traces along the surface of the optoelectronic component (612), the substrate (606), and the printed circuit board (618). The processing module (610) may be secured to either side of the printed circuit board (618).

Upon receiving an electrical signal from the optoelectronic component (612), the processing module (610) can then format the received electrical signal into a format to be used by standard digital circuitry. Alternative, if the optoelectronic component is a source device, then the processing module (610) will send the processed electrical signal to the source device through the conductive traces, bond pads, and melted solder.

Figure 7A:
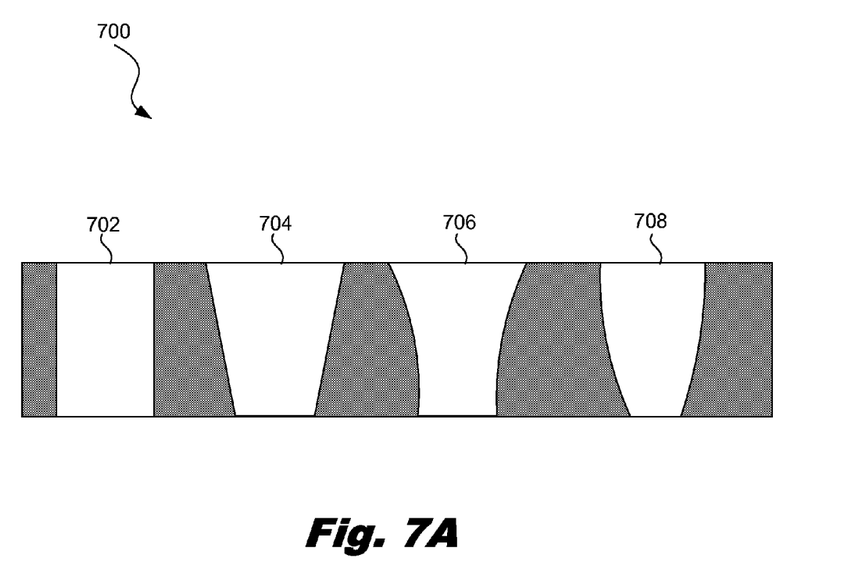
FIGS. 7A and 7B are diagrams showing illustrative types of through optical vias, according to one example of principles described herein.
Figure 7B:
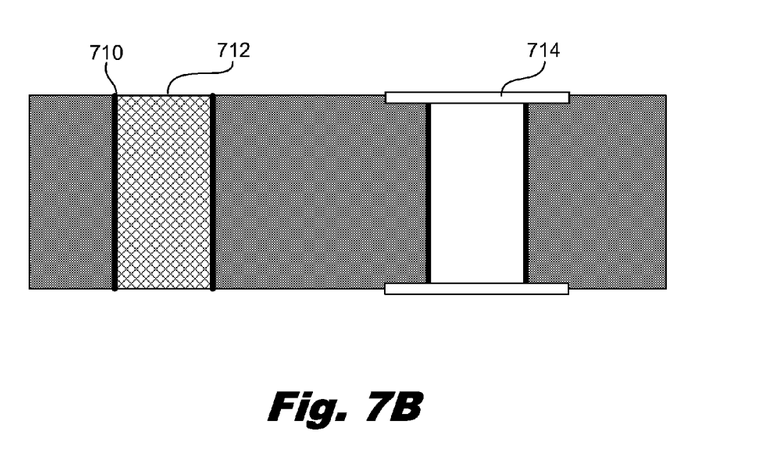

FIGS. 7A and 7B are diagrams showing illustrative types of through optical vias (700). As mentioned above, a waveguide is a structure that allows for the propagation of electromagnetic radiation. The shape of the structure will affect the manner in which light propagates through the waveguide. Additionally, the materials used in the construction of the waveguide will affect the manner in which light propagates through the waveguide.

FIG. 7A is a diagram showing waveguides of three different shapes. Particularly, a straight waveguide (702), an expanding waveguide (704), a parabolic expanding waveguide (706), and a parabolic contracting waveguide (708) are shown. A straight waveguide (702) is one in which the cross-sectional area of the waveguide remains the same throughout the entire length of the waveguide. An expanding waveguide (704) is one in which the cross-sectional area of the waveguide increases linearly along the length of the waveguide. A parabolic expanding waveguide (706) is one in which the cross-sectional area of the waveguide increases non-linearly along the length of the waveguide. A parabolic contracting waveguide (708) is one in which the cross-sectional area of the waveguide decreases non-linearly along a length of the waveguide. The cross-sectional shape of a waveguide may be circular, elliptical, rectangular, or any polygonal shape.

FIG. 7B is a diagram illustrating waveguides constructed of different materials. As mentioned above, waveguides designed to propagate electromagnetic radiation within typical optical frequencies can be done through use of an inner transparent dielectric material surrounded by an outer material having a higher index of refraction then the inner material. The materials used as the inner and outer materials will affect the difference in the index of refraction between the two materials and thus the manner in which the light propagates through the waveguide.

In one example, a solid transparent dielectric material (712) can be used to form the center of the through optical via. Either a dielectric material with a lower index of refraction than the transparent material (712) or a reflective material may be used as a lining (710) at the walls of the through optical via. The reflective material may be a metallic material such as copper, gold, aluminum, or silver. Furthermore, a dielectric layer may be placed over the reflective layer to protect it from oxidation.

In one example, the center of the waveguide may be either a vacuum or be filled with air, or inert gases. The walls of such a waveguide may be coated with a material having a high reflectivity. This allows the light to propagate through the waveguide through successive reflections. The number of bounces is small because the waveguide is relatively short. The waveguide may only have a length of a few hundred microns. Additionally, a transparent covering (714) such as a dry film can be used to cover the center of the waveguide. This will prevent contaminants from entering the center of the waveguide.

Figure 8:
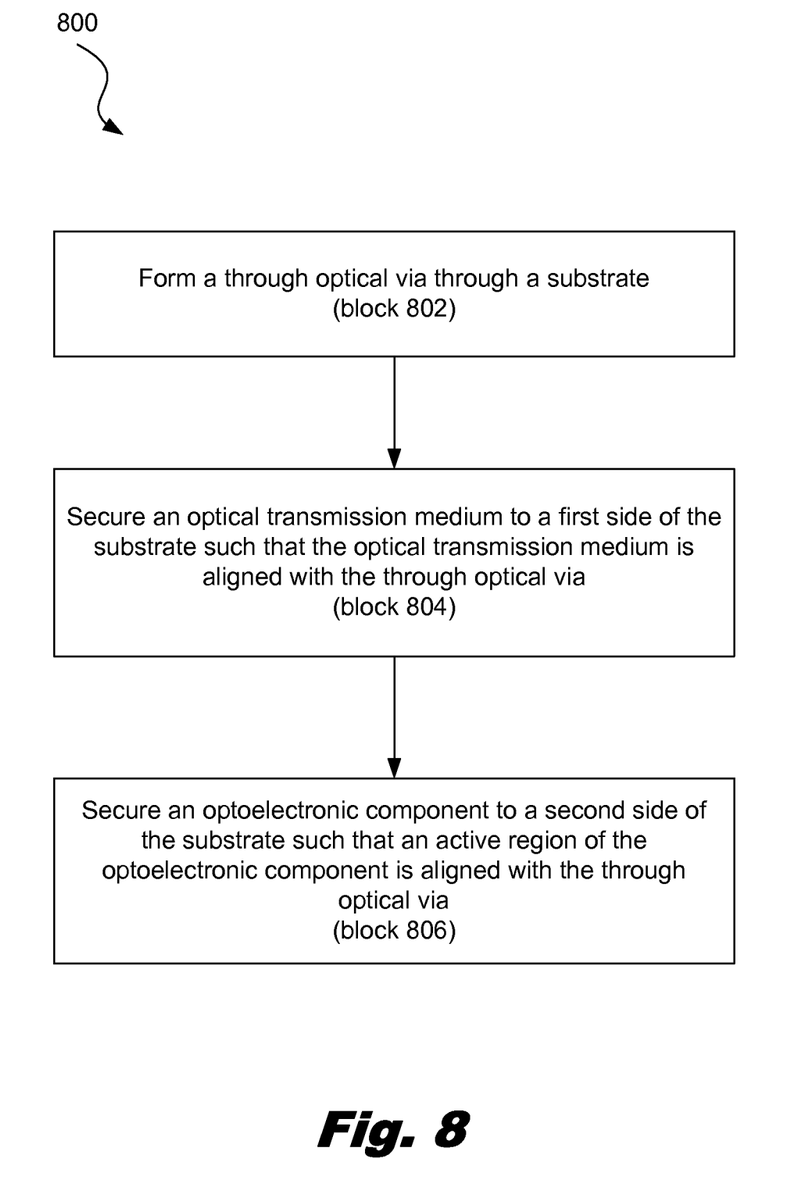
FIG. 8 is a flowchart showing an illustrative method for passive optical alignment, according to one example of principles described herein.

FIG. 8 is a flowchart showing an illustrative method for passive optical alignment. According to certain illustrative examples, the method includes forming (block 802) a waveguide through a substrate, securing (block 804) an optical transmission medium to a first side of the substrate such that the optical transmission medium is aligned with the through optical via, and securing (block 806) an optoelectronic component to a second side of the substrate such that an active region of said optoelectronic component is aligned with said through optical via.

In conclusion, through use of methods and systems described herein, optoelectronic components such as source devices and receiving devices can be effectively coupled to an optical transmission medium without the use of lens systems. Thus, the coupling can be achieved efficiently at a lower cost. Additionally, more optical connections can be fit into a smaller space, thus providing a more efficient use of chip space.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A system for passive optical alignment comprising:
   a through optical via formed through a substrate, said optical via comprising an open center providing an open passageway through said substrate and inner walls coated with a material having a lower index of refraction than the passageway;
   an optical transmission medium secured to a first side of said substrate such that said optical transmission medium is aligned with said through optical via;
   an optoelectronic component secured to a second side of said substrate such that said an active region of said optoelectronic component is aligned with said through optical via;
   a circuit board for said optoelectronic component; and
   a heat sink on which said optoelectronic component is disposed, said circuit board surrounding said heat sink.

2. The system of claim 1, further comprising:
   a first set of bond pads disposed on said second side of said substrate;
   a second set of bond pads disposed onto said optoelectronic component, said second set of bond pads being spatially identical to said first set of bond pads;
   wherein upon reflowing solder bumps between said first set of bond pads and said second set of bond pads, said optoelectronic component is brought into alignment with said through optical via.

3. The system of claim 1, further comprising:
   a set of spheres secured to a mechanical connector of said optical transmission medium; and
   a set of hemispheric holes spatially positioned identically to a positioning of said spheres.

4. The system of claim 3, wherein a diameter of said holes is such that placement of said spheres into said holes aligns said optical transmission medium with said through optical via.

5. The system of claim 1, further comprising a number of additional through optical vias through said substrate, said additional through optical vias to pass light between additional active regions of said optoelectronic component secured to said substrate and additional transmission media.

6. The system of claim 2, further comprising transmission and receiving circuitry electrically connected to said optoelectronic component through at least one of said bond pads on said substrate.

7. The system of claim 1, in which said optical transmission medium is secured to said substrate by a pin and hole mechanism.

8. The system of claim 1, further comprising:
   solder bumps comprising connecting the optoelectronic component to the substrate; and
   a signal pathway between said optoelectronic component and a processing module, the signal pathway comprising one or more of the solder bumps.

9. The system of claim 1, wherein the passageway is at vacuum.

10. The system of claim 1, wherein the passageway is filled with air.

11. The system of claim 1, wherein the passageway is filled with an inert gas.

12. A method for passive optical alignment, the method comprising:
- forming a through optical via through a substrate, the optical via having an open center extending through the substrate;
- securing a receiving end of an optical transmission medium directly one end of said open-center optical via and to a first side of said substrate such that said optical transmission medium is aligned with said through optical via;
- securing an optoelectronic component to a second side of said substrate such that an active region of said optoelectronic component is aligned with said open-center optical via;
- providing a circuit board for said optoelectronic component; and
- disposing said optoelectronic component on a heat sink, said circuit board surrounding said heat sink.

13. The method of claim 12, wherein securing said optoelectronic component to a second side of said substrate comprises:
- forming a first set of bond pads on said second side of said substrate; and
- forming a second set of bond pads onto said optoelectronic component, said second set of bond pads being spatially identical to said first set of bond pads;
- wherein upon reflowing solder bumps between said first set of bond pads and said second set of bond pads, said active region of said optoelectronic component is brought into alignment with said through optical via; and
- routing a signal from said optoelectronic component to a processing module through one or more of said solder bumps.

14. The method of claim 12, further comprising:
- disposing a set of spheres onto a terminal of said optical transmission medium; and
- disposing a set of hemispheric holes spatially identical to said spheres, a diameter of said holes being such that placement of said spheres into said holes aligns said optical transmission medium to said through optical via.

15. The method of claim 12, wherein said through optical via comprises a gas-filled passageway disposed between reflective walls.

16. The method of claim 12, further comprising a number of additional through optical vias through said substrate, said additional through optical vias to pass light between additional active regions of said optoelectronic component secured to said substrate and additional transmission media.

17. An optical system comprising:
- a first set of bond pads disposed on a first side of a substrate;
- a through optical via formed through said substrate;
- a second set of bond pads disposed on an optoelectronic component, said second said of bond pads being spatially identical to said first set of bond pads;
- solder bumps disposed between said first set of bond pads and said second set of bond pads to align an active region of said optoelectronic component to said through optical via;
- a processing module, wherein a signal path between the optoelectronic component and the processing module comprises at least one of the solder bumps;
- a coupling mechanism to secure an optical transmission medium to a second side of said substrate such that said optical transmission medium is aligned with said through optical via;
- a circuit board for said optoelectronic component; and
- a heat sink on which said optoelectronic component is disposed, said circuit board surrounding said heat sink,
- wherein said through optical via allows light to pass between said optoelectronic component and said optical transmission medium.

18. The system of claim 17, wherein said through optical via comprises a transparent dielectric material disposed between reflective walls.

19. The system of claim 17, wherein said through optical via is one of: an expanding waveguide, parabolic expanding waveguide, and a parabolic contracting waveguide.

* * * * *